United States Patent

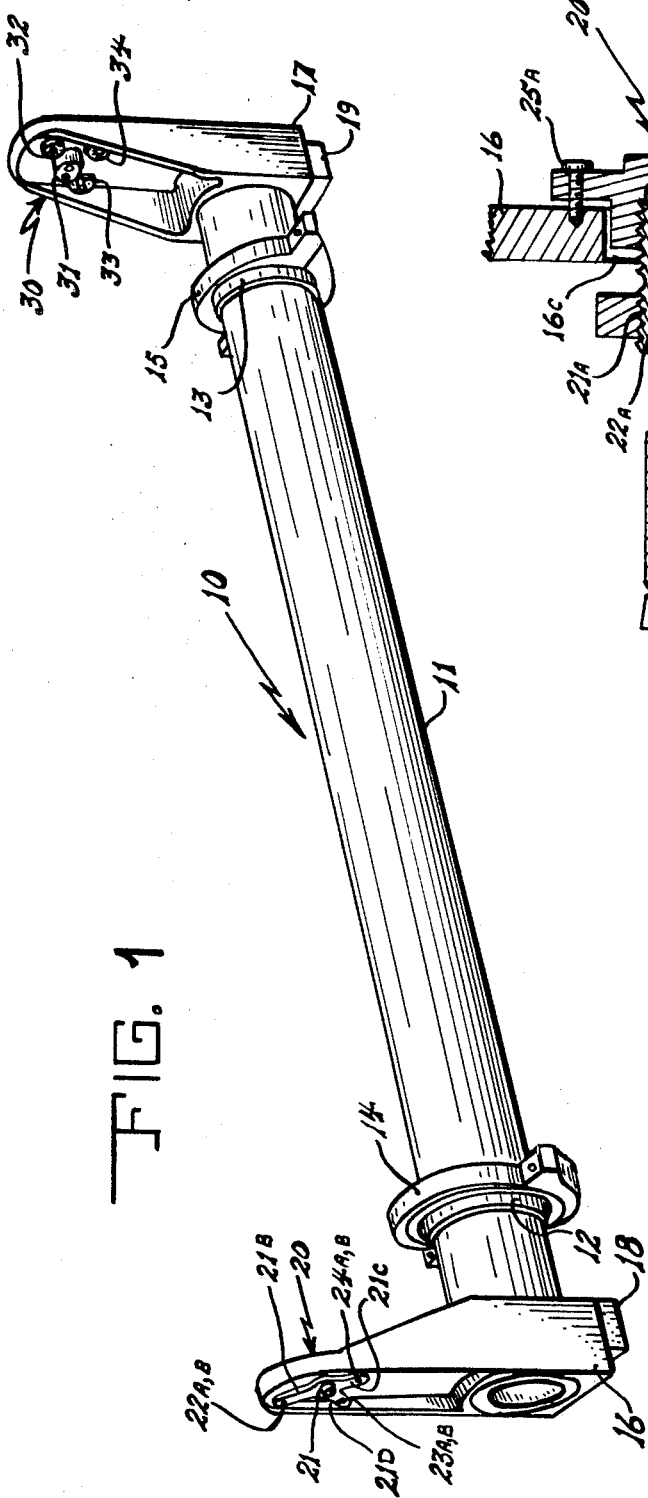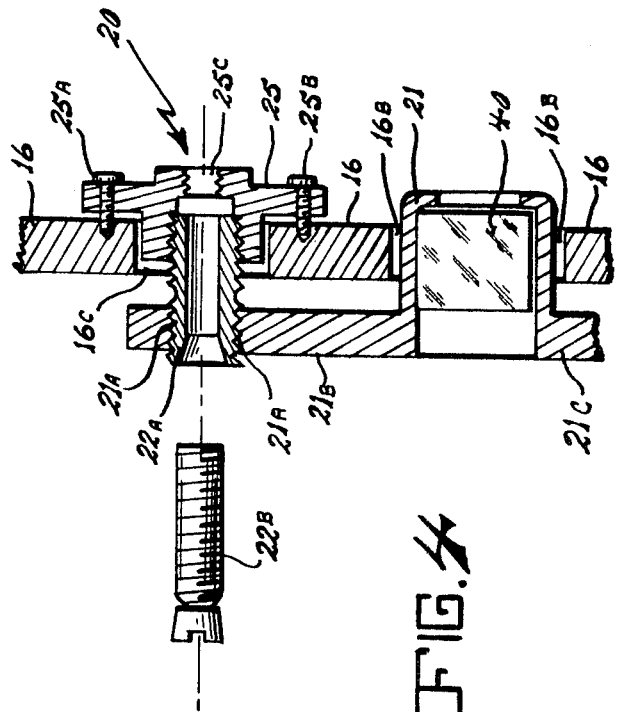

[11] 3,581,231

| [72] | Inventor | Robert J. Freiberg<br>Thousand Oaks, Calif. |
|---|---|---|
| [21] | Appl. No. | 833,907 |
| [22] | Filed | June 17, 1969 |
| [45] | Patented | May 25, 1971 |
| [73] | Assignee | The United States of America as represented by the Secretary of the Air Force |

[54] ULTRA-STABLE LASER CAVITY MIRROR SUPPORT ASSEMBLY
2 Claims, 4 Drawing Figs.

[52] U.S. Cl.................................................. 331/94.5,
74/89.15, 75/150, 248/466, 248/476, 350/252,
350/285, 350/304
[51] Int. Cl........................................................ H01s 3/02,
F16h 29/20
[50] Field of Search............................................ 331/94.5;
248/466, 476; 75/150; 74/89.15; 350/252, 285,
288, 304

[56] References Cited
UNITED STATES PATENTS
| 3,225,307 | 12/1965 | Weissman .................. | 331/94.5 |
|---|---|---|---|
| 3,400,596 | 9/1968 | Laich .......................... | 331/94.5X |
| 3,428,915 | 2/1969 | Leone et al. ................. | 331/94.5 |
| 3,440,563 | 4/1969 | Clement ...................... | 331/94.5 |

OTHER REFERENCES
Gould, " Collison Lasers," " APPLIED OPTICS" Supplement 2 on Chemical Lasers, 1965 pps. 59— 67

*Primary Examiner*—Ronald L. Wibert
*Assistant Examiner*—R. J. Webster
*Attorneys*—Harry A. Herbert, Jr. and Arsen Tashjian

ABSTRACT: An ultrastable laser cavity mirror support assembly, for use with laser utilizing external mirrors, which prevents laser output loss caused by mirror misalignment. The assembly includes: a beryllium open-ended tube; two circumferential supports for the tube, each located a predetermined equal distance inward from the nearest end of the tube; first and second counterweighted flat plates affixed, respectively, to each end of the tube and parallel to each other; first and second mirror tuning mechanisms, each mounted on and supported by, respectively, the first and second counterweighted flat plates; and means for rigidly securing the tube, and components mounted and affixed thereto, to a laser housing and an external abutment in the desired orientation.

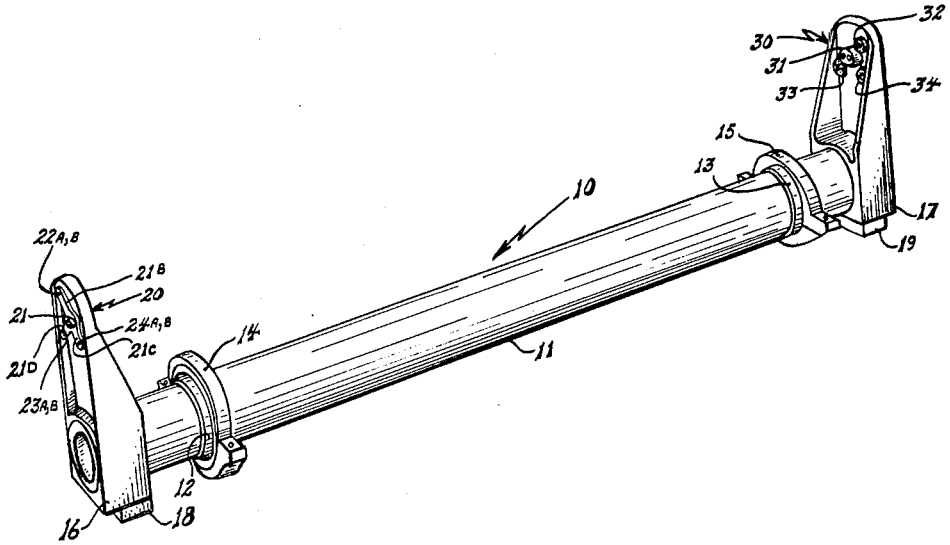

3,581,231

ULTRA-STABLE LASER CAVITY MIRROR SUPPORT ASSEMBLY

BACKGROUND OF THE INVENTION

This invention relates to a support for a laser package and, more particularly, to a support assembly for laser mirrors.

It is well-known in the art that deformation caused by mechanical loading, angular distortion caused by thermal gradients, and change in laser frequency may, and do, individually and collectively adversely affect the alignment of laser mirrors and, thereby, result in laser output power loss from the laser package.

In the prior art, laser mirrors were mounted directly to the external sidewall of the laser package or housing. As a result, the laser cavity was very sensitive to vibration and mechanical and thermal distortion of, and within, the laser package. Further, thermal stresses would develop in the package during warm up and could, and would on occasion, detune the laser cavity to the point of zero output power. Therefore, the prior art laser package design was unsuitable for certain desirable uses, such as airborne applications.

This invention eliminates these disadvantages; obviates these limitations; fills a current need; and, thereby, advances the state-of-the-art.

SUMMARY OF THE INVENTION

This invention pertains to an ultrastable laser cavity mirror support assembly for use with lasers utilizing external mirrors.

An object of this invention is to provide a laser cavity mirror support assembly which will prevent mirror misalignment, and resultant output power loss, caused by vibration and mechanical and thermal distortion of the laser package.

Another object of this invention is to prevent power output fluctuation during warm up due to misalignment of the laser mirrors.

Still another object of this invention is to permit orientation of the laser package, as a whole, in any position without any change in power output.

A further object is to permit use of the laser package, as a whole, in an airborne environment, such as on an aircraft.

A still further object is to permit finer cavity tuning, and locking in place, so as to render unnecessary any subsequent tuning.

These, and still other, objects of this invention will become readily apparent after a consideration of the description of the invention and reference to the drawings, wherein the same reference characters refer to the same components.

DESCRIPTION OF THE DRAWINGS

FIG. 1 is a perspective view, in simplified form, of the exterior of a preferred embodiment of the invention;

FIG. 4 is an enlarged side elevation view, in detail, of a portion of the end of the preferred embodiment shown in FIG. 3.

DESCRIPTION OF THE PREFERRED EMBODIMENT

Figure 2:
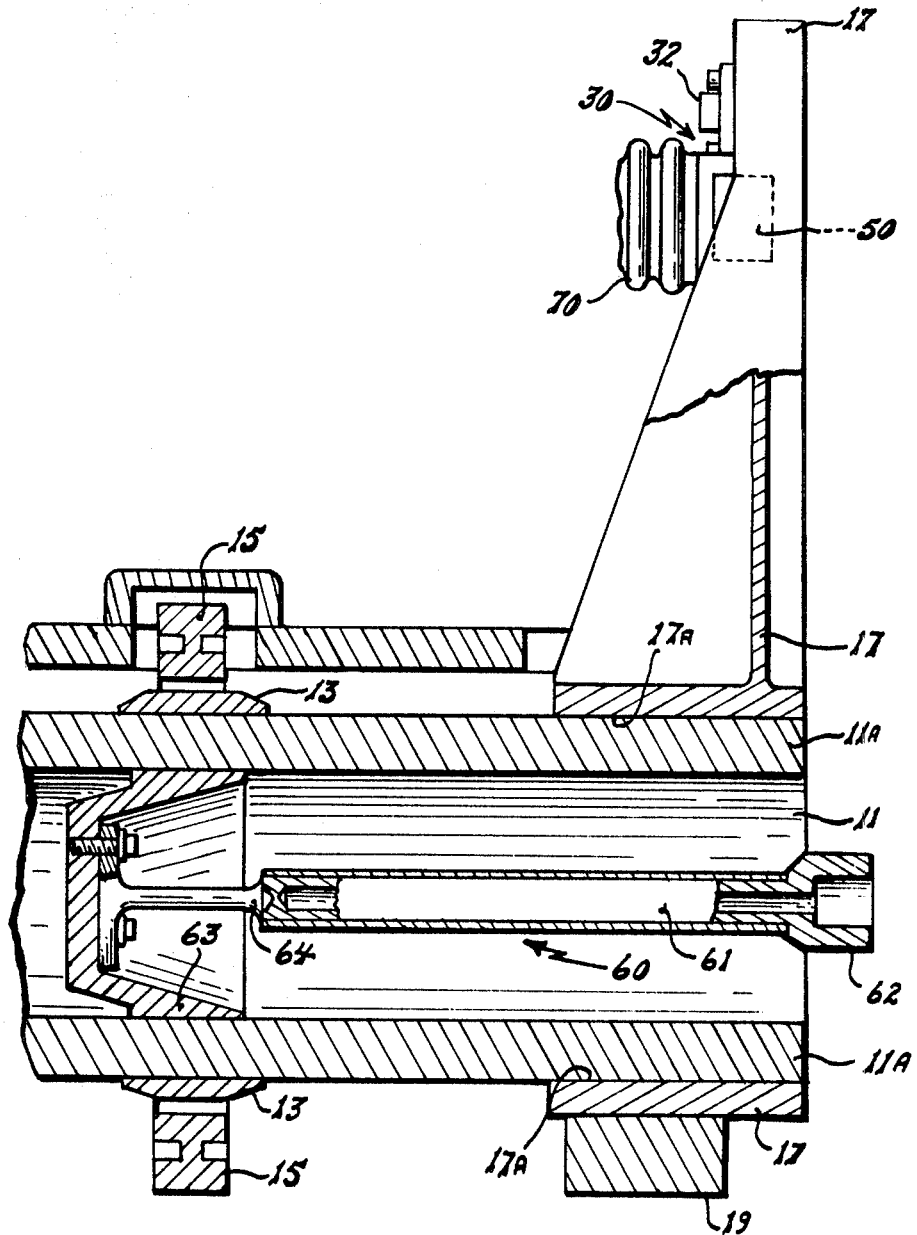
FIG. 2 is a side elevation view, partly cross-sectioned and partly fragmented, of one end of the preferred embodiment shown in FIG. 1.

With reference to FIG. 1, therein is shown, in simplified form, the exterior of a preferred embodiment of the invention, in a perspective view.

The embodiment of the invention, a laser cavity mirror support assembly 10, includes, as shown in FIG. 1: a support tube 11, preferably of beryllium; a first centering ring 12 encircling, i.e., circumferentially abutting, support tube 11 at a predetermined location along the support tube 11; a second centering ring 13 encircling support tube 11 at a predetermined location along support tube 11; a sliding tube support 14 encircling, in turn, first centering ring 12; a slotted tube support 15 encircling, in turn, second centering ring 13; a first flat plate 16, with counterweight 18 at one end of support tube 11; a second flat plate 17, with counterweight 19, at the other end of support tube 11; a first tuning mechanism 20, for containing, supporting and aligning a first laser mirror (not shown in FIG. 1), with said tuning mechanism 20 is mounted on and supported by first flat plate 16 and which includes, as components, a first spider mirror mount 21 with a plurality of spider arms such as 21B, 21C and 21D, a plurality of adjustment screws such as 22A, 23A, and 24A, a plurality of expander screws such as 22B, 23B and 24B (one for each adjustment screw) which fit into and mate with individual adjustment screws such as 22A, 23A and 24A, and a plurality of gimbal-type retainers (not shown in FIG. 1), one for each said adjustment screw (or, each said expander screw); and, a second tuning mechanism 30, for containing, supporting and aligning a second laser mirror (not shown in FIG. 1), with said tuning mechanism 30 mounted on and supported by second flat plate 17 and which includes, as components, a second spider mirror mount 31 with a plurality of spider arms (not shown in FIG. 1), a plurality of adjustment screws (not shown in FIG. 1), a plurality of expander screws (not shown in FIG. 1) with an expander screw for each adjustment screw and with each said expander screw fitting into and mating with said individual adjustment screws, and a plurality of gimbal-type retainers such as 32, 33 and 34, one for each said adjustment screw (or, each said expander screw).

In FIG. 2 is shown, in side elevation, partly cross-sectioned and partly fragmented, one end of the preferred embodiment shown in FIG. 1.

Shown, among other components and in relative position thereto, are: second centering ring 13; slotted tube support 15; support tube 11 with wall 11A; a second flat plate 17 with aperture 17A to accept and mate with support tube 11; counterweight 19 affixed to second flat plate 17; and gimbal-type retainer 32. Also shown is positioning rod subassembly 60, with positioning rod 61 having open attachment end 62, positioner 63, and flexible joint 64 which connects positioning rod 61 with positioner 63. Second laser mirror 50 and bellows 70 are also shown, for clarification and illustrative purposes.

Figure 3:
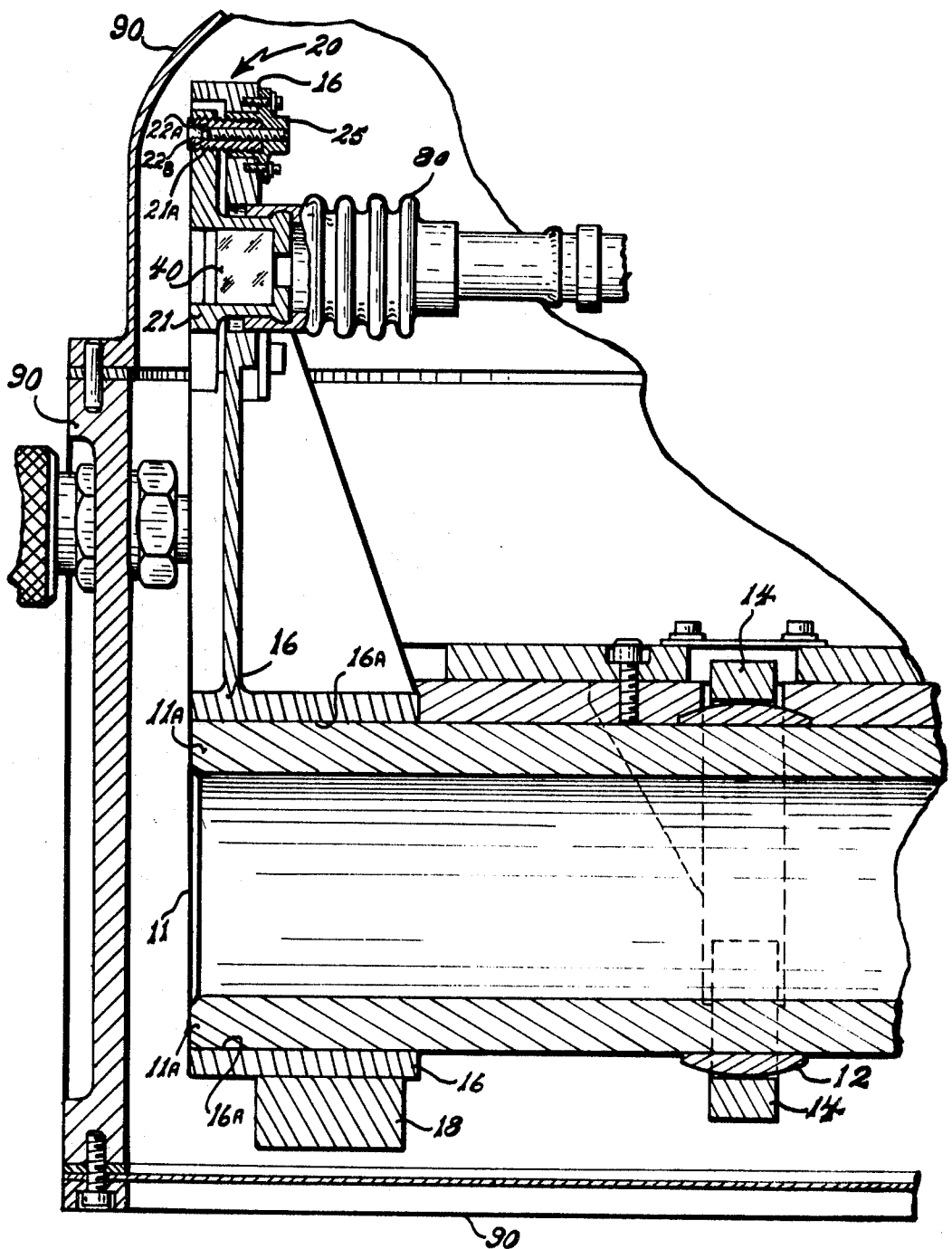
FIG. 3 is also a side elevation view, partly cross-sectioned and partly fragmented, of the other end of the preferred embodiment shown in FIG. 1.

In FIG. 3 is shown, in side elevation, partly cross-sectioned and partly fragmented, the other end of the preferred embodiment shown in FIG. 1.

Shown therein are: first centering ring 12; sliding tube support 14; support tube 11 with wall 11A; first flat plate 16 with aperture 16A to accept and mate with support tube 11; counterweight 18 affixed to first flat plate 16; and first tuning mechanism 20 which includes spider mirror mount 21, adjustment screws such as 22A, expander screws such as 22B, and gimbal-type retainers such as 25. First laser mirror 40, bellows 80, and laser housing 90 are also shown, for clarification and illustrative purposes.

In FIG. 4 is shown, in side elevation view and enlarged and in detail, of a portion of the end of the preferred embodiment shown in FIG. 3. More specifically, what is shown in first tuning mechanism 20 which includes: first spider mirror mount 21; adjustment screw 22A; expander screw 22B; and gimbal-type retainer 25 with retaining screws 25A and 25B and threaded stepdown aperture 25C. Also shown are: first flap plate 16, with aperture 16B to permit entry of the inwardly disposed portion of first spider mirror mount 21, and with aperture 16C to permit passage of adjustment screw 22A and expander screw 22B and mating of said adjustment screw 22A and expander screw 22B with gimbal-type retainer 25. First spider mirror mount 21 has a plurality of spider arms such as 21B and 21C each of which has a threaded aperture, such as 21A to permit the passage and containment of, for example, adjustment screw 22A and expander screw 22B. First laser mirror 40 is also shown for illustrative and clarification purposes.

With reference to FIGS. 1 to 4, inclusive, my preferred embodiment 10 structurally includes: an open-ended support tube 11, FIG. 1, with wall 11A FIGS. 2 and 3, which is preferably of beryllium; two circumferential centering rings 12, FIGS. 1 and 3, and 13, FIGS. 1 and 2, which are positioned and bonded, or otherwise affixed, to support tube 11, FIGS. 1, 2 and 3, at a predetermined equal distance inward from the nearest end of said support tube 11, FIGS. 1, 2 and 3; a sliding tube support 14, FIGS. 1 and 3, encircling and connected to centering ring 12, FIGS. 1 and 3, and a slotted tube support 15, FIGS. 1 and 2, encircling and connected to centering ring 13, FIGS. 1 and 2, with tube supports 14 and 15, FIGS. 1, 2 and 3, each being located on equal distance inward from the nearest end of support tube 11, FIGS. 1, 2 and 3; flat plates 16, FIGS. 1, 3 and 4, and 17, FIGS. 1 and 2, with each having apertures 16A, FIG. 3, and 17A, FIG. 2, to accept and mate with support tube 11, FIGS. 2 and 3, and apertures such as 16B, FIG. 4, to permit entry of the inwardly disposed portion of spider mirror mounts such as 21, FIGS. 1, 3 and 4, and apertures such as 16C, FIG. 4, to permit passage of adjustment screws such as 22A, FIGS. 1, 3 and 4, and expander screws such as 22B, FIGS. 1, 3 and 4, and mating of said adjustment screws and expander screws with gimbal-type retainers such as 25, FIGS. 3 and 4, with said flat plates 16 and 17 being bonded, or otherwise affixed, to respective ends of support tube 11, parallel to each other; counterweights 18, FIGS. 1 and 3, and 19, FIGS. 1 and 2, affixed, respectively, to the bottom surface of flap plates 16, FIGS. 1 and 3, and 17, FIGS. 1 and 2; tuning mechanisms 20, FIGS. 1, 3 and 4, and 30, FIGS. 1 and 2, mounted respectively on flat plates 16, FIGS. 1, 3 and 4, and 17, FIGS. 1 and 2, and including spider mirror mount such as 21, FIGS. 1, 3 and 4, connected to gimbal-type retainers such as 25, FIGS. 3 and 4, by adjustment screws such as 22A and expander screws 22B, FIGS. 3 and 4, with said gimbal-type retainers being attached to said flat plates 16 and 17 by retaining screws such as 25A and 25B, FIG. 4; and positioning rod subassembly 60, FIG. 2, with positioner 63, FIG. 2, bonded or otherwise affixed to the internal wall 11A surface of tube 11, and positioning rod 61, FIG. 2, having an open attachment end 62, FIG. 2, by which support assembly 10, FIG. 1, may be attached, connected or the like to laser housing 90, or an external abutment, in the desired orientation, and with said open attachment end 62 being connected to positioner 63 by flexible joint 64, FIG. 2.

MODE OF OPERATION OF THE PREFERRED EMBODIMENT

The method of operation of my invention can be better understood if the theory and phenomena upon which it is based is stated and explained.

Firstly, in my embodiment the cantilever arrangement of flat plates 16 and 17, FIGS. 1, 2 and 3, with respect to the tube supports 14 and 15, FIGS. 1, 2 and 3, causes a deformation of tube 11, FIGS. 1, 2 and 3, which exactly nullifies the deformation of tube 11, FIGS. 1, 2 and 3, caused by the weight of tube 11, FIGS. 1, 2 and 3, which as a result is uniformly distributed along its length. If the support points for tube 11, FIGS. 1, 2 and 3, are correctly selected, zero net tube distortion will occur; flat plates 16 and 17, FIGS. 1, 2 and 3, will remain parallel to each other and aligned; and, with the use of tuning mechanisms 20 and 30, FIGS. 1, 2, 3 and 4, laser mirrors 40 and 50, FIGS. 2, 3 and 4, will remain aligned after they are, in fact, aligned. This stable condition will be maintained under all accelerations, since the supporting members 14 together with 12, FIGS. 1 and 3, and 15 together with 13, FIGS. 1 and 2, for tube 11, FIGS. 1, 2 and 3, are circumferential; and flat plates 16 and 17, FIGS. 1, 2 and 3, together with tuning mechanisms 20 and 30, FIGS. 1, 2, 3 and 4, and with laser mirrors 40 and 50, FIGS. 2, 3 and 4, are counterweighted by weights 18 and 19, FIGS. 1, 2 and 3, such that the center of gravity lies along the long axis of tube 11, FIGS. 1, 2 and 3.

Secondly, the nature of tube supports 14 with 12, FIGS. 1 and 3, and 15 with 13, FIGS. 1 and 2, are such that no stresses which are exerted upon the laser package, of which my embodiment is a part, can be transferred through them to cause distortion of tube 11, FIGS. 1, 2 and 3. The supports (14 with 12 and 15 with 13, FIGS. 1, 2 and 3) allow longitudinal motion (e.g., thermal expansion) of tube 11, FIGS. 1, 2 and 3, without placing strain upon tube 11, FIGS. 1, 2 and 3, even though the long axis of tube 11, FIGS. 1, 2 and 3, may have rotated slightly with respect to the laser package.

Thirdly, longitudinal displacement of tube 11, FIGS. 1, 2 and 3, is restrained by positioning rod assembly 60, FIG. 2, as a whole and, more specifically, by positioner 63, FIG. 2, which acts through the support point defined by support 15 together with centering ring 13, FIGS. 1 and 2, and consequently can exert no undesirable torque upon tube 11, FIGS. 1, 2 and 3.

Fourthly, the physical properties of the material of which support tube 11, FIGS. 1, 2 and 3, is made are important, since tube 11, FIGS. 1, 2 and 3, must not distort under the mechanical stress or due to thermal gradients within tube 11, FIGS. 1, 2 and 3, and further since the resonant frequency of support assembly 10, FIG. 1, which is primarily determined by tube 11, FIGS. 1, 2 and 3, must be maintained well above the frequencies encountered in airborne applications. After a thorough investigation, including analysis and experimentation, beryllium was found to be the best material for tube 11, FIGS. 1, 2 and 3, due to its high ratio of Young's modulus to mass density and also due to its low ratio of thermal expansion to thermal conductivity.

Fifthly, tuning mechanisms 20 and 30, FIGS. 1, 2, 3 and 4, for alignment of laser mirrors such as 40 and 50, FIGS. 2, 3 and 4, employs a differential screw mechanism which not only permits a coarse adjustment of $1.25 \times 10^{12}$ in./turn and a fine adjustment of $1.39 \times 10^{13}$ in./turn, but also permits locking in place by expander screw such as 22B, FIGS. 3 and 4, and eliminates the necessity of further alignment, once the cavity (and mirrors 40 and 50, FIGS. 2, 3 and 4) is optimumly aligned. It is appropriate here to note that adjustment screws such as 22A, FIGS. 1, 3 and 4, are slotted to allow easier adjustment; that apertures such as 21A, FIG. 4, of spider mirror mount arms such as 21B, FIG. 1, are threaded preferably at 80 threads/inch; and that gimbal-type retainers such as 25, FIGS. 3 and 4, are threaded preferably in a stepdown manner with the forward portion threaded at 80 threads/inch to mate with expander screws such as 22B, FIGS. 3 and 4, and with the rear portion threaded at 72 threads/inch to mate with adjustment screws such as 22A, FIGS. 1, 3 and 4.

Additionally, as a matter of related pertinent information, in preferred embodiments of my invention, support tubes such as 11, FIGS. 1, 2 and 3, were from 34.032 inches to 34.048 inches in length; had external diameters of from 2.472 inches to 2.475 inches; and, had internal diameters of from 1.730 inches to 1.733 inches. Supports such as 14 together with centering ring 12, FIGS. 1 and 3, and such as 15 with centering ring 13, FIGS. 1 and 2, which were used with the aforementioned support tubes, were from 4.300 inches to 4.980 inches from the ends of the support tube. These dimensions are furnished merely as illustrative, and not as limitations.

Further, although reference has been made, in describing a preferred embodiment, as to the application of my invention to the laser art, obviously my invention may be modified for use in any art where ultrastable support and alignment of components in tandem or the like is desired or is necessary.

Also, while there has been described the fundamental features of my invention, as applied to a particular embodiment for use in the laser art, it is to be understood that this is by way of illustration only and is not intended as a limitation, and that various substitutions and omissions may be made by those skilled in the laser art without departing from the spirit of the invention. For example, support tube 11, FIGS. 1, 2 and 3, may be made of material other than beryllium.

What I claim is:

1. An ultrastable laser cavity mirror support assembly, for use with a laser which utilizes first and second external mirrors, comprising:

a. an open-ended support tube;

b. first and second supports, each circumferentially abutting and encircling the external surface of said support tube and each supporting said support tube, with each said support located a predetermined equal distance inward from the nearest end of said tube;
c. first and second flat plates parallel to each other and located, respectively, at each end of said support tube;
d. means for mounting the first and second external laser mirrors, and means for tuning the first and second external laser mirrors, wherein said means for mounting and said means for tuning include:
 1. spider-type mirror mount with arms having a threaded aperture in each spider arm;
 2. adjustment-type screw, one for each said spider arm, threaded and of suitable dimensions to enter into, mate with, and pass through the threaded aperture of said spider-type mirror mount arm;
 3. an expander-type screw, one for each said spider arm threaded and of suitable dimensions to enter into, mate with, and pass through said adjustment-type screw;
 4. and, a gimbal-type retainer, one for each said spider arm, with a threaded stepdown aperture to accept and mate with said adjustment-type screw and said expander-type screw;
e. first and second counterweights attached, respectively, to said first and said second flat plates, with said first and said second counterweights each being of a weight such that, together with the weight of said first and said second flat plates, and the weight of said means for mounting, and the weight of said means for tuning, exactly nullify the deformation of said support tube which is caused by the weight of said support tube; and
f. and, means for attaching said support tube, said supports for said support tube, said flat plates, said means for mounting, and said counterweights, to an abutment.

2. The assembly, as set forth in claim 1, wherein said open-ended support tube is of beryllium.